Feb. 10, 1970　　　　K. C. RUSCH　　　　3,494,607
IMPACT ENERGY ABSORBING FLUID CUSHION STRUCTURE
Filed Oct. 2, 1967
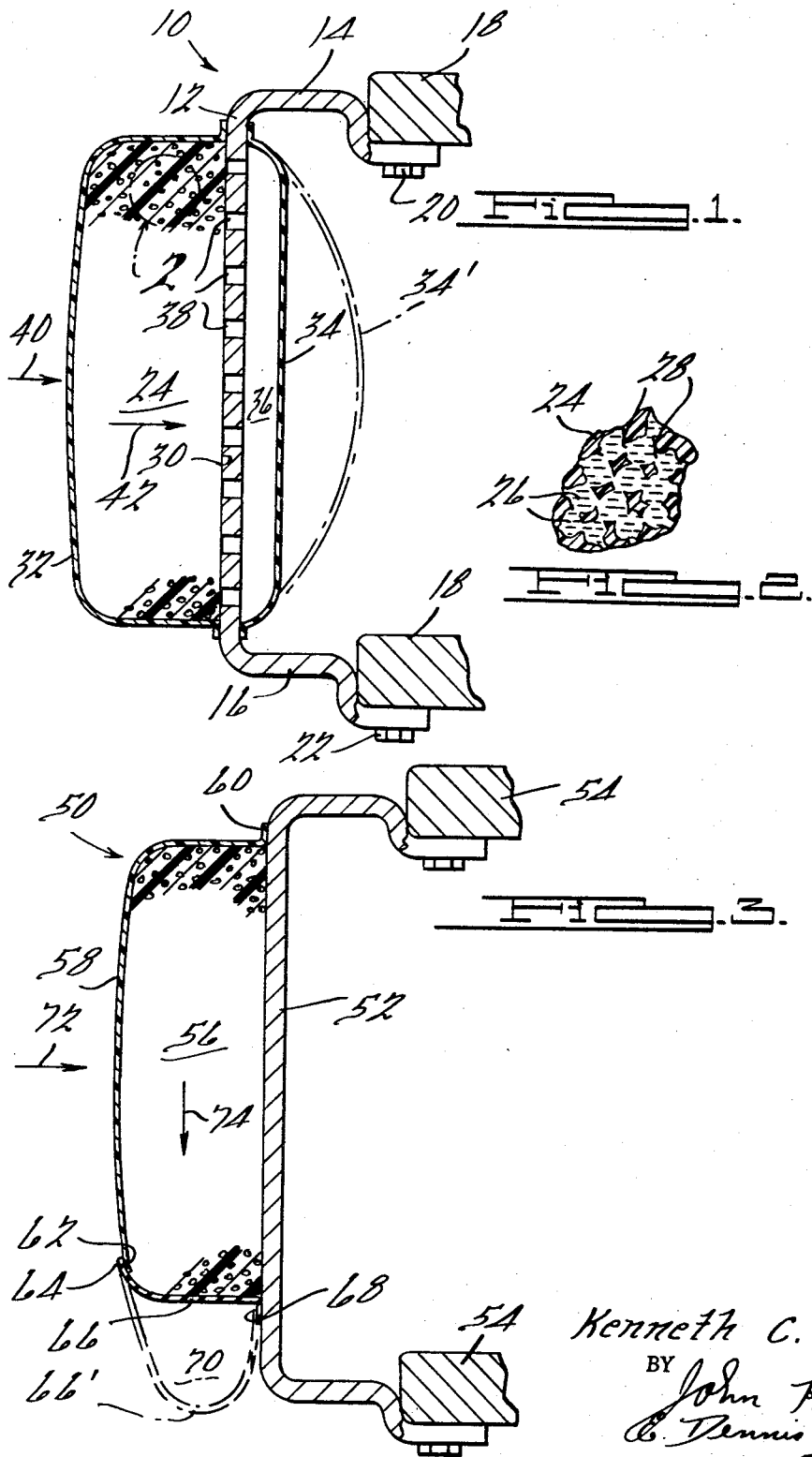
INVENTOR.
Kenneth C. Rusch
BY John R. Faulkner
C. Dennis O'Connor
ATTORNEYS.

United States Patent Office 3,494,607
Patented Feb. 10, 1970

3,494,607
IMPACT ENERGY ABSORBING FLUID CUSHION STRUCTURE
Kenneth C. Rusch, Detroit, Mich., assignor to Ford Motor Company, Dearborn, Mich., a corporation of Delaware
Filed Oct. 2, 1967, Ser. No. 672,047
Int. Cl. B60r *19/08*
U.S. Cl. 267—1          5 Claims

ABSTRACT OF THE DISCLOSURE

Structure for absorbing impact energy and adapted for use as a bumper for a motor vehicle. This apparatus includes an elastomeric member constructed of open cell foam and attached to a supporting plate. The foam is impregnated with fluid and is vented to an expandable chamber into which fluid may flow from the foam when the foam is deformed by the force of an impact.

BACKGROUND OF THE INVENTION

Various structures designed to receive and minimize the damage resulting from impact forces are known in the art. Motor vehicle bumper designs include bumpers having resiliently deformable members. Primarily, such bumpers are intended to prevent damage to the bumper surface as the result of slight impact rather than to absorb large amounts of impact energy.

It is an object of this invention to provide impact energy absorbing structure adapted for use as a motor vehicle bumper that not only will ameliorate the damage due to slight impacts, but also will absorb larger amounts of impact energy as occur during severe collisions. The impact energy absorbing function of the structure of this invention is due to the deflection and load bearing characteristics of the structure. Also, these characteristics of the structure of this invention vary conveniently in response to specific impact conditions as well as render the structure reusable following an impact occurrence.

SUMMARY OF THE INVENTION

Impact energy absorbing structure constructed in accordance with this invention comprises a rigid supporting plate and a resiliently deformable porous member secured to said plate. This member is formed from elastomeric foam of the open cell type. An impervious elastomeric skin partially surrounds said member and the latter is impregnated with liquid. Also included is elastomeric means operatively secured to the supporting plate and partially defining an expandable chamber communicating with the porous member so that fluid flow may occur from the porous member to the expandable chamber upon the compression of the member due to impact forces.

DESCRIPTION OF THE DRAWING

FIGURE 1 is a side elevation sectional view of a first embodiment of impact energy absorbing structure constructed in accordance with this invention;

FIGURE 2 is an enlargement of the area of impact energy absorbing structure of FIGURE 1 designated by the numeral 2; and FIGURE 3 is a view similar to FIGURE 1, but illustrating a second embodiment of impact energy absorbing structure constructed in accordance with this invention.

DETAILED DESCRIPTION OF THE INVENTION

Referring now in detail to the drawings and in particular to FIGURES 1 and 2, the numeral 10 denotes generally a first embodiment of impact energy absorbing structure constructed in accordance with this invention and utilized as a motor vehicle bumper. This structure includes a rigid supporting plate 12 having flanges 14 and 16 extending perpendicularly therefrom and secured to a supporting structure 18 by fasteners 20 and 22 respectively. Since impact energy absorbing structure 10 is illustrated as a bumper of a motor vehicle, the supporting structure 18 comprises a portion of the vehicle body sheet metal supporting structure.

A resiliently deformable porous member 24 is provided and is formed, as best illustrated in FIGURE 2, of elastomeric foam of the open cell type. This foam includes a plurality of cells 26 interconnected by interstices 28. One surface 30 of foam member 24 is secured to plate 12 by an adhesive or other suitable bonding techniques. The remaining surface of foam member 24 is covered by an elastomeric, impervious skin 32. Foam member 24 is impregnated with a liquid, such as water, that is held within the foam by skin 32.

Secured to the side of plate 12 remote from foam member 24 is an elastomeric diaphragm 34, partially defining an expandable chamber 36. Communication between foam member 24 and chamber 36 is provided by a plurality of apertures 38 extending through supporting plate 12.

Upon receiving an impact force, illustrated by the arrow 40 of FIGURE 1, foam member 24 and its outer skin 32 will be deformed causing fluid flow in the direction of the arrow 42. Fluid will flow from foam member 24, through apertures 38 and into expandable chamber 36, causing said chamber to expand so that diaphragm 34 assumes the position 34' represented in phantom.

As structure 10 reacts to impact force 40 as described above, energy is dissipated by three separate occurrences: (a) fluid flow to the open cell foam, (b) expansion of elastomeric diaphragm 34 and (c) compression of the foam matrix and its flexible outer skin 32.

It has been found that materials having the following characteristics may be used satisfactorily to practice this invention. Foam 24 may be formed from polyurethane and have a cell size of 0.04 cm. and a porosity of 9.97. Skin 32 may be polyurethane having a thickness of 1 cm. and a modulus of elasticity of 75 kg./cm.$^2$. Diaphragm 34 may be formed from latex having a thickness of 0.15 cm. and a modulus of elasticity of kg./cm.$^2$. Water is acceptable as the impregnating liquid. Skin 32 may have applied thereto a decorative coating such as paint if so desired.

FIGURE 3 illustrates a second embodiment of structure 50 constructed in accordance with this invention and including a supporting plate 52 secured to a structural member 54 in a manner similar to the mounting of plate 14 of FIGURE 1. A resiliently deformable porous member 56 constructed of elastomeric, open cell foam has one of its surfaces secured to plate 52. The part of the outer surface of foam member 56 that is not contiguous with plate 52 has a portion thereof surrounded by an impervious elastomeric outer skin 58. One end 60 of skin 58 is secured to plate 52 and the other end 62 of skin 58 is secured to one end 64 of an elastomeric diaphragm 66. The end 68 of diaphragm 66 remote from end 62 of skin 58 is secured to plate 52 as illustrated. It is to be understood that the skin 58 may be formed integrally with foam 56 during the formation of said foam.

As may be observed from the drawing, diaphragm 56 is positioned closely adjacent the outer surface of foam 56. Foam member 66 is impregnated with fluid such as water that is retained within foam 56 by skin 58 and diaphragm 66.

Upon an impact force being directed against energy absorbing structure 50 as represented by the arrow 72, displacement of skin 58 and a deformation of foam member 56 will occur causing a fluid flow in the direction of the arrow 74. Although diaphragm 66 is illustrated as contiguous to foam member 56, in reality small spaces are present between these members due to irregularity in adjoining surfaces. These spaces comprise an expandable chamber 70 that is expanded due to the fluid flow represented by the arrow 74 as diaphragm 66 is displaced into the position 66' shown in phantom.

It readily may be observed that the factors contributing to energy absorption described relative to the embodiment of this invention illustrated in FIGURE 1 are present upon an impact of the embodiment of the invention illustrated in FIGURE 3.

Both embodiments of the invention are reusable following an impact applied thereto. Upon the cessation of impact forces directed against the foam members of this invention, the resilient foam will resume its original position illustrated. Elastomeric diaphragms 34 and 56 also will tend to resume their original positions. The combination of a vacuum created within the foam members as these members assume the original position and the resilient forces exerted by the diaphragms urges the liquid forced into the expandable chambers to resume its original orientation within the foam members.

This invention thus provides an impact energy absorbing structure of relatively simple design and ease of construction that will absorb large amounts of impact energy, may be reused following a specific impact and is particularly adapted for use as a bumper of a motor vehicle.

I claim:

1. Energy absorbing structure comprising a rigid supporting plate, a resiliently deformable porous member secured to said plate, an impervious elastomeric skin partially surrounding said member, said member being impregnated with liquid, and elastomeric means operatively secured to said supporting plate and partially defining an expandable chamber communicating with said member, whereby fluid flow will occur from said member to said expandable chamber upon compression of said member due to impact forces acting on said member.

2. Structure according to claim 1, wherein said member is elastomeric foam of the open cell type.

3. Structure according to claim 2, wherein said skin is integrally formed with said foam member.

4. Structure according to claim 2, wherein said foam member is secured to one side of said plate and said elastomeric means are secured to the other side of said plate, said chamber defined by said elastomeric means and the surface of said other side of said plate, said plate having liquid conduit means extending therethrough communicating between said foam member and said expandable chamber.

5. Structure according to claim 2, wherein said foam member is impregnated with water.

References Cited

UNITED STATES PATENTS

| | | | |
|---|---|---|---|
| 1,504,828 | 8/1924 | Moore et al. | 293—71 |
| 1,784,387 | 12/1930 | Postel | 180—92 |
| 2,166,511 | 7/1939 | Witzenmann | 152—157 |
| 2,555,436 | 6/1951 | Druilhet | 188—94 |
| 2,719,611 | 10/1955 | Previnquieres | 188—100 |
| 2,829,915 | 4/1958 | Claveau | 293—71 |
| 3,141,655 | 7/1964 | Platt | 256—1 |

ARTHUR L. LA POINT, Primary Examiner

H. BELTRAN, Assistant Examiner

U.S. Cl. X.R.

114—219; 152—157; 180—92; 188—1, 88; 256—1; 293—1, 63, 71

UNITED STATES PATENT OFFICE
CERTIFICATE OF CORRECTION

Patent No. 3,494,607  Dated February 10, 1970

Inventor(s) Kenneth C. Rusch

It is certified that error appears in the above-identified patent and that said Letters Patent are hereby corrected as shown below:

Column 2, line 37, delete "to" and substitute -- through --; line 43, delete "9.97" and substitute -- 0.97 --; line 47, before "kg./cm.²" insert -- 5 --; line 68, delete "diaphragm 56" and substitute -- diaphragm 66 --; line 70, delete "Foam member 66" and substitute -- Foam member 56 --.

Column 3, line 21, delete the numeral "56" and substitute -- 66 --.

SIGNED AND SEALED
OCT 13 1970

(SEAL)
Attest:

Edward M. Fletcher, Jr.
Attesting Officer

WILLIAM E. SCHUYLER, JR.
Commissioner of Patents